United States Patent
Karim

(10) Patent No.: US 10,848,199 B1
(45) Date of Patent: Nov. 24, 2020

(54) SYSTEMS AND METHODS FOR COMMUNICATING DATA OVER SATELLITES

(71) Applicant: Syed Karim, Chicago, IL (US)

(72) Inventor: Syed Karim, Chicago, IL (US)

(*) Notice: Subject to any disclaimer, the term of this patent is extended or adjusted under 35 U.S.C. 154(b) by 0 days.

(21) Appl. No.: 16/115,264

(22) Filed: Aug. 28, 2018

Related U.S. Application Data

(60) Provisional application No. 62/551,257, filed on Aug. 29, 2017.

(51) Int. Cl.
*H04B 1/69* (2011.01)
*H04B 7/216* (2006.01)
*H04B 7/185* (2006.01)

(52) U.S. Cl.
CPC .......... *H04B 1/69* (2013.01); *H04B 7/18526* (2013.01); *H04B 7/216* (2013.01); *H04B 2001/6912* (2013.01)

(58) Field of Classification Search
CPC ...... H04B 1/69; H04B 7/18526; H04B 7/216; H04L 27/34; H04L 27/362; H04L 1/0071; H04L 25/03834; H04L 1/0041
See application file for complete search history.

(56) References Cited

U.S. PATENT DOCUMENTS

| | | | | |
|---|---|---|---|---|
| 5,053,782 A | * | 10/1991 | Levinberg | H04B 7/216 342/352 |
| 2006/0040609 A1 | * | 2/2006 | Petschke | H04H 20/74 455/3.02 |
| 2010/0079333 A1 | * | 4/2010 | Janky | G01S 19/43 342/357.24 |
| 2015/0094089 A1 | * | 4/2015 | Moeglein | H04W 4/029 455/456.1 |
| 2015/0319725 A1 | * | 11/2015 | Marshall | H04W 56/0015 370/350 |

\* cited by examiner

*Primary Examiner* — Ted M Wang

(57) ABSTRACT

Systems for communicating data through a satellite are disclosed. The systems generally include a terrestrial radio, such as a chirp spread spectrum modulator. The terrestrial radio is configured to uplink data to one or more satellites. The one or more satellites are configured to receive the data from the terrestrial radio. In addition, the systems include terrestrial receivers, such as one or more chirp spread spectrum receivers, positioned at ground level, which are configured to receive the data from the one or more satellites.

11 Claims, 4 Drawing Sheets

SYSTEMS AND METHODS FOR COMMUNICATING DATA OVER SATELLITES

CROSS-REFERENCE TO RELATED APPLICATIONS

This application claims priority to, and incorporates by reference, U.S. provisional patent application Ser. No. 62/551,257, filed on Aug. 29, 2017.

FIELD OF THE INVENTION

The field of the present invention relates to systems and methods that involve the use of terrestrial transceivers for communicating data (such as media) over satellites. More particularly, the systems and methods involve the use of radios intended for terrestrial applications, for communicating data over satellites.

BACKGROUND OF THE INVENTION

The many benefits of satellite-mediated communication have been known for years. In fact, as the global community and economy become more dependent upon Internet access and connectivity, the more important satellite-mediated communication will become. Such importance is particularly applicable for those located in rural and remote regions around the world, which cannot rely exclusively on terrestrial providers of Internet access. Likewise, the growing number of "Internet of Things" (IoT) applications will yield new and increasing demands for wireless communication among different devices, which are often reliant upon robust and reliable satellite communications.

In view of the foregoing, there is a continuing demand for new and improved methods and systems for communicating through satellites. As the following will demonstrate, the systems and methods described herein provide new and improved methods for communicating data through medium-earth orbit, highly-elliptical orbit, or geostationary satellites.

SUMMARY OF THE INVENTION

According to certain aspects of the present invention, systems for communicating data through one or more geostationary satellites are provided. The systems generally include at least one radio originally designed for terrestrial applications, such as a chirp spread spectrum (CSS) transceiver, which may be integrated into (or operate apart from) an optional satellite teleport. The terrestrial radio is configured to uplink data to one or more satellites. The one or more satellites are configured to receive the data from the terrestrial radio. In addition, the systems include one or more compatible receivers containing terrestrial radios, which are positioned at ground level and configured to receive the data from the one or more satellites. In certain embodiments, the satellite teleport may be, for example, an 802.15.4 or 802.11 terrestrial transceiver. Still further, the invention provides that the systems may include a local oscillator that is configured to be combined with the satellite teleport, with the local oscillator being configured to operate at standard intermediate frequencies of the various types of satellites.

According to additional aspects of the present invention, methods of using the systems described herein for communicating data through a satellite are provided. The invention provides that, in certain embodiments, such methods may be used to uplink data to the satellite, and downlink data from the satellite (using the systems described herein), for the purpose of streaming media to (and/or caching media within) local ground-level devices. Still further, the invention provides that such methods may be useful for "Internet of Things" (IoT) applications.

The above aspects of the present invention are further described and exemplified in the Detailed Description set forth below.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Definitions

The terms "CSS" and "chirp spread spectrum" mean a digital spread spectrum protocol that employs wideband linear frequency modulated chirp pulses to encode data. In this context, a "chirp" consists of a sinusoidal signal having a frequency that increases or decreases as a function of time. A benefit to using CSS (as one example of a radio originally designed for terrestrial applications), in the systems and methods described herein, is that the CSS protocol is relatively resilient to channel noise. In addition, CSS is relatively resistant to multi-path facing, particularly when operating at relatively low power (as in the case of certain applications of the inventions described herein, such as the IoT applications referenced herein). Although CSS has been used in outdoor wireless communications, such applications have largely (if not completely) been terrestrial (and have not involved communications with medium-earth orbit, highly-elliptical earth orbit, or geostationary satellites).

The term "geostationary satellite" means a type of geosynchronous satellite that orbits the Earth, positioned at an altitude of approximately 35,800 kilometers (22,300 miles) directly over the equator of the Earth, which revolves in the same direction as the Earth rotates.

The term "satellite teleport" means a satellite ground station that is configured to operate as a hub, which connects a geostationary satellite with a terrestrial telecommunications network (such as the Internet).

The term "802.11 terrestrial transceiver" means a group of specifications defined by the Institute of Electrical and Electronics Engineers (IEEE), which apply to wireless local area network communications (also known as WLAN and WiFi).

The term "802.15.4 terrestrial transceiver" means Institute of Electrical and Electronics Engineers (IEEE) 802.15.4a (and IEEE 802.15.4a-2007).

Satellite Communication Systems

Figure 1:
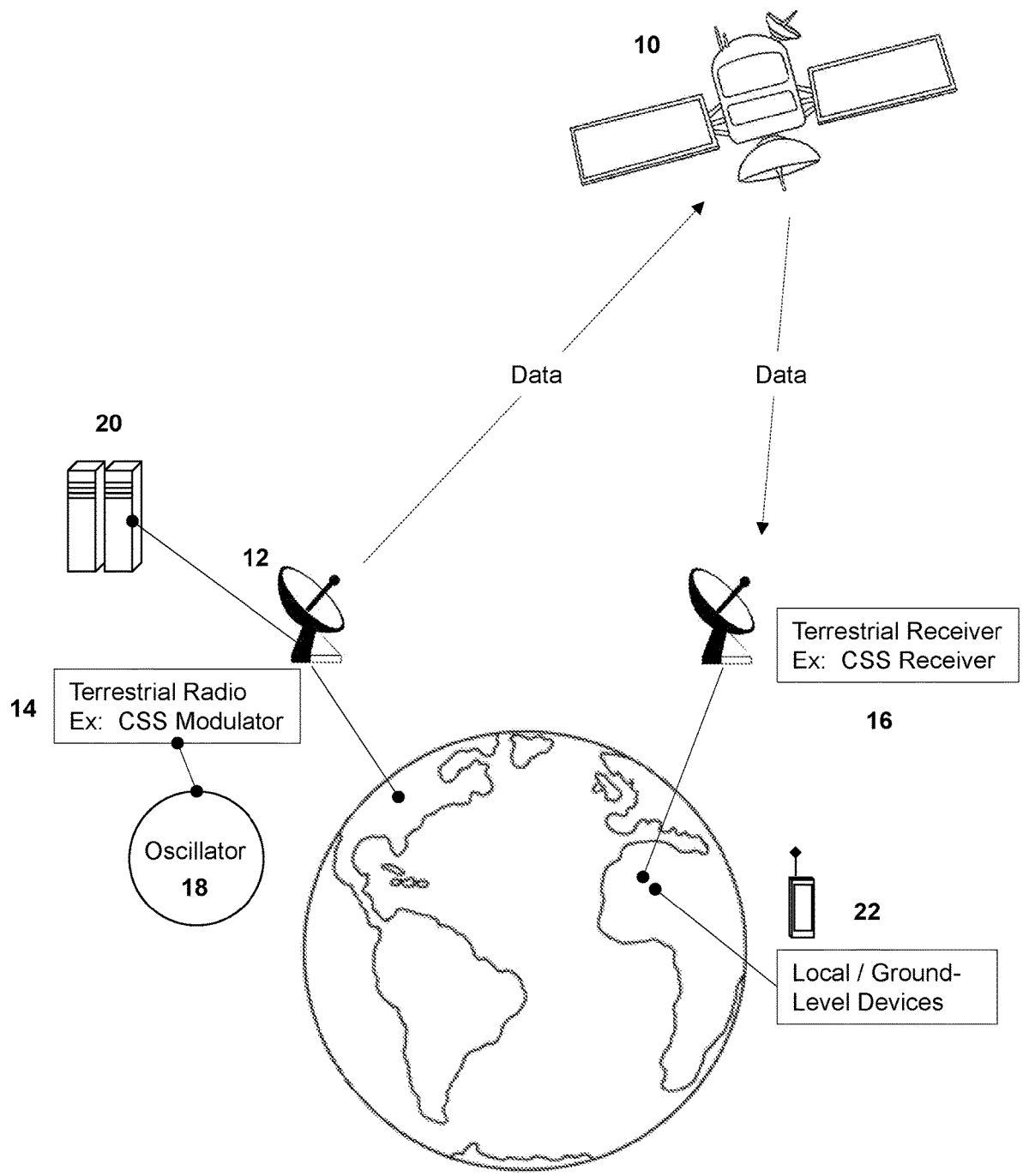
FIG. 1: a diagram that illustrates the various components of the systems described herein.

Referring now to FIG. 1, according to certain preferred embodiments of the present invention, systems for communicating data through one or more geostationary satellites 10 are provided. More particularly, the systems may, optionally, include a satellite teleport 12 that is equipped with a radio originally designed and configured for terrestrial applications, such as a chirp spread spectrum modulator 14 (or, alternatively, a radio originally designed and configured for terrestrial applications, such as a chirp spread spectrum modulator 14, may be included separate and apart from a satellite teleport 12). The invention provides that the terrestrial radio, e.g., the chirp spread spectrum modulator 14, is configured to uplink data to the one or more satellites, such as medium-earth orbit, highly-elliptical orbit, or geostationary satellites 10. The one or more satellites 10 are, in turn, configured to receive the data from the terrestrial radio (e.g., chirp spread spectrum modulator 14). In addition, the systems include terrestrial radios, such as one or more chirp spread spectrum receivers 16, positioned at ground level, which are configured to receive the data from the one or more satellites 10 (e.g., medium-earth orbit, highly-elliptical orbit, or geostationary satellites 10). Those of ordinary skill in the art will understand that "at ground level" (and similar phrases), should be construed to mean at or near ground level, e.g., including locations fixed to towers and aerial platforms. In certain embodiments, the invention provides that the satellite teleport 12 may be an 802.15.4 or 802.11 terrestrial transceiver.

Figure 2:
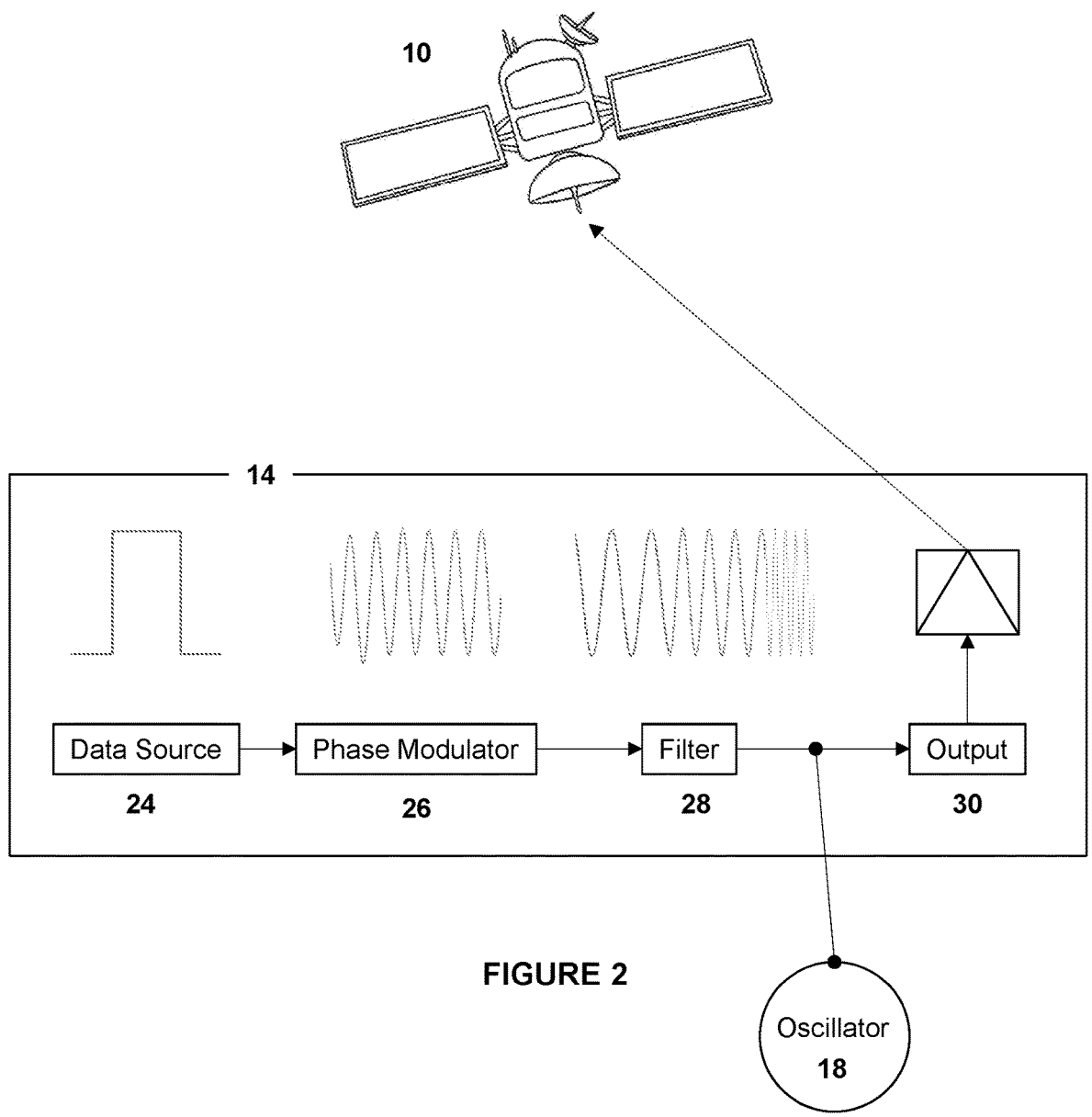
FIG. 2: a diagram that illustrates various components of a radio originally designed for terrestrial application, exemplified by the chirp spread spectrum modulator shown and described herein.

Referring now to FIG. 2, a diagram of a non-limiting example of a terrestrial radio (a chirp spread spectrum modulator 14) that may be used in the systems described herein is provided. As illustrated therein, the chirp spread spectrum modulator 14 is configured to receive data from a data source 24, which may consist of one or more servers 20 (FIG. 1), a computer, and/or other devices that are configured to generate and output digital data. The invention provides that the data are provided to a phase modulator 26 that converts the digital data into a modulated signal at a specified frequency (and, in some embodiments, differentially encodes the data onto an appropriate carrier, using an appropriate modulation scheme such as DPSK). The invention provides that the differentially encoded modulated signal is next converted from a continuous sinusoidal signal into a pulsed sinusoidal signal. In certain embodiments, the modulated data (consisting of a pulsed sinusoidal signal) are then provided to a filter 28, which is configured to convert the modulated signal into a chirp output signal (i.e., a filter 28 that expands the pulsed sinusoidal signal over a period of time), at which point the chirp output signal is provided to an output port 30. The output port 30—which will preferably comprise an antenna—is configured to transmit the chirp output signal to the one or more satellites 10 (e.g., medium-earth orbit, highly-elliptical orbit, or geostationary satellites 10). In addition, the invention provides that the output port 30 may be configured to allow a user to specify a preferred transmitting frequency and, optionally, to amplify the chirp output signal as desired.

Still further, the invention provides that the systems may include a local oscillator 18 that is configured to be combined with the satellite teleport 12. In such embodiments, the invention provides that the local oscillator 18 is preferably configured to operate at standard intermediate frequencies of the satellite 10. As used herein, the term "local oscillator" means an electrical oscillator, which is typically used along with a mixer, to change the frequency of a signal. The frequency modification process, which is sometimes referred to as "heterodyning," produces the sum and difference frequencies from the frequency of the local oscillator 18 and the frequency of the input signal. A local oscillator, when combined with a mixer, is often referred to as a "converter."

Figure 3:
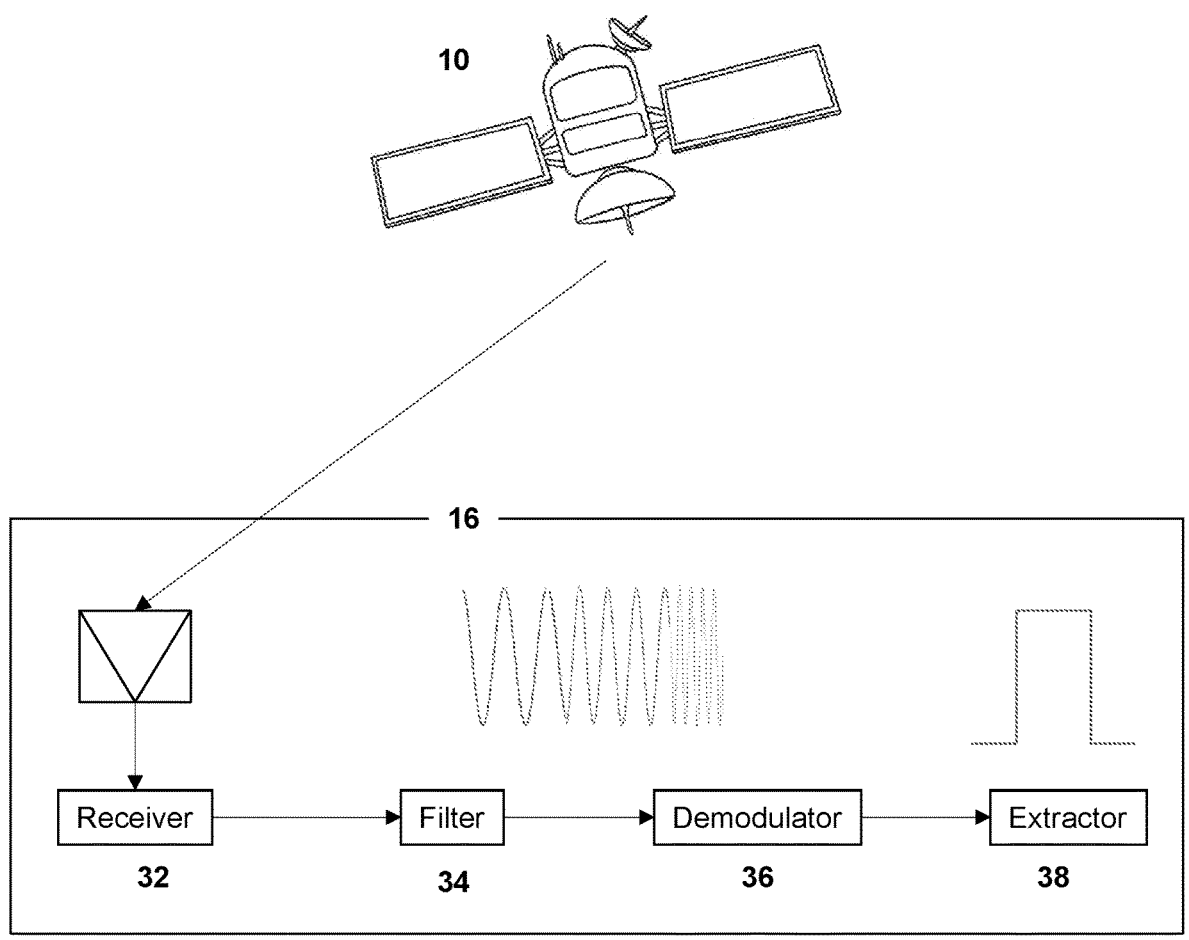
FIG. 3: another diagram that illustrates various components of a radio originally designed for terrestrial application, exemplified by the chirp spread spectrum modulator shown and described herein.

Referring now to FIG. 3, a diagram of a non-limiting example of a chirp spread spectrum receiver 16 that may be used in the systems described herein is provided. More particularly, as shown therein, the chirp spread spectrum receiver 16 will preferably include a CSS signal receiver component 32 (e.g., an antenna). Upon receiving the chirp output signal, the signal may be converted from the transmitted frequency into a frequency that is compatible with one or more dispersive filters 34 (in addition, in certain embodiments, upon receiving the chirp output signal, the signal may also be amplified prior to further processing). The invention provides that the one or more dispersive filters 34 are preferably configured to collate and harmonize overlapping chirp output signals. The invention provides that the processed signal is then preferably provided to a phase demodulator 36 (such as a differential phase demodulator 36), which is an electronic circuit (or computer program in a software-defined radio) that is configured to recover the data content from the modulated signal. The invention provides that the phase demodulator 36 is configured to then transmit the recovered data content to an extractor 38, which can be accessed by other devices to obtain the demodulated data content from the chirp spread spectrum receiver 16.

Still further, in certain embodiments, the invention provides that the satellite teleport 12 may be operably connected to (or in communication with) one or more servers 20 (e.g., through an Internet connection), which may represent a source of data (e.g., the data source 24) that are uplinked to the one or more satellites 10. According to such embodiments, the systems of the invention (and methods described below) provide a wireless and effective means for transferring data via satellites 10 from one or more servers 20 to many different (and far away) locations around the globe.

Satellite Communication Methods

Figure 4:
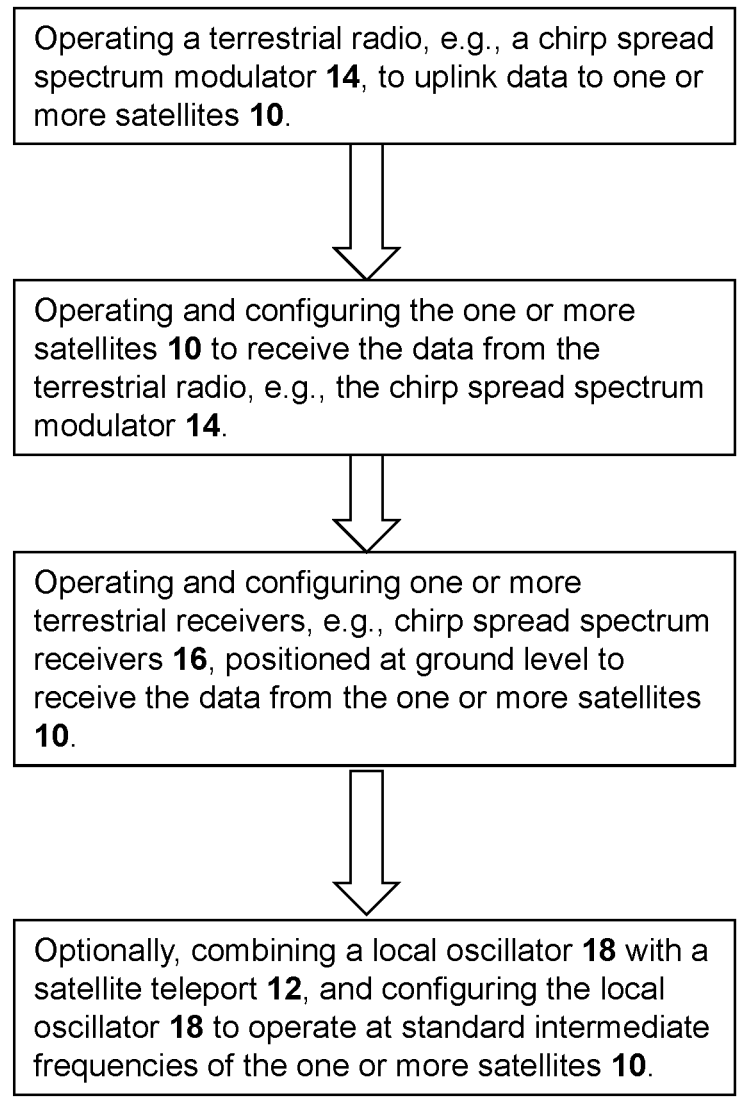
FIG. 4: a flow chart that summarizes the various steps of the methods described herein.

Referring now to FIG. 4, according to additional preferred embodiments of the present invention, methods of using the systems described herein for communicating data through a satellite (e.g., medium-earth orbit, highly-elliptical orbit, or geostationary satellites 10) are provided. More specifically, for example, the methods include the following general steps: operating a satellite teleport 12 that comprises a terrestrial radio (such as, but not limited to, a chirp spread spectrum modulator 14) to uplink data to one or more satellites 10; operating and configuring the one or more satellites 10 to receive the data from the terrestrial radio (e.g., the chirp spread spectrum modulator 14); and operating and configuring one or more terrestrial receivers (e.g., chirp spread spectrum receivers 16) positioned at ground level to receive the data from the one or more satellites 10. In addition, the invention provides that such methods may, optionally, further include combining a local oscillator 18 with the satellite teleport 12, and configuring the local oscillator 18 to operate at standard intermediate frequencies of the one or more satellites 10.

The invention provides that, in certain embodiments, such methods may be used to uplink data to the one or more satellites 10, and downlink data from the satellites 10, for the purpose of streaming media to (and/or caching media within) local ground-level devices 22. In addition, in certain embodiments, the invention provides that the local ground-level devices 22 may include low-power wireless area network transceivers, which may be particularly useful in "Internet of Things" (IoT) applications. That is, when the local ground-level devices 22 include low-power wireless area network transceivers, the systems and methods described herein may be particularly useful for enabling interconnection and communication among a plurality of user-oriented computing devices, e.g., embedded in everyday objects, which enables such devices to send and receive data via satellites 10.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for communicating data through a satellite, which comprises:
    (a) at least one satellite, wherein the satellite is a medium-earth orbit satellite, a highly-elliptical orbit satellite, or a geostationary satellite;
    (b) a terrestrial radio that is configured to uplink data to the at least one satellite, wherein the terrestrial radio is a chirp spread spectrum modulator; and
    (c) a terrestrial receiver positioned at ground level, which is configured to receive the data from the at least one satellite, wherein the data that is uplinked to the satellite, and the data that the terrestrial receiver receives from the satellite, comprises media and internet protocol data that the terrestrial receiver is configured to stream to local ground-level devices, wherein the media and internet protocol data originate from one or more servers that are operably connected to, or in communication with, the terrestrial radio.

2. The system of claim 1, wherein the at least one satellite is configured to transmit the data to a plurality of chirp spread spectrum receivers positioned at ground level.

3. The system of claim 1, wherein the terrestrial radio is an 802.15.4 terrestrial transceiver or 802.11 terrestrial transceiver.

4. The system of claim 1, which further includes a local oscillator, and an associated mixer, which is configured to be combined for satellite uplinking, wherein the local oscillator is configured to operate at standard radio frequencies of the at least one satellite.

5. The system of claim 1, wherein the terrestrial radio is a long-term evolution (LTE) device.

6. A method for communicating data through a satellite, which comprises:
    (a) operating a terrestrial radio to uplink data to a satellite, wherein (i) the satellite is a medium-earth orbit satellite, a highly-elliptical orbit satellite, or a geostationary satellite and (ii) the terrestrial radio is a chirp spread spectrum modulator;
    (b) operating and configuring the satellite to receive the data from the terrestrial radio; and
    (c) operating and configuring a terrestrial receiver positioned at ground level to receive the data from the satellite, wherein the data that is uplinked to the satellite, and the data that the terrestrial receiver receives from the satellite, comprises media and internet protocol data that the terrestrial receiver is configured to stream to local ground-level devices, wherein the media and internet protocol data originate from one or more servers that are operably connected to, or in communication with, the terrestrial radio.

7. The method of claim 6, which further comprises operating and configuring the satellite to transmit the data to a plurality of chirp spread spectrum receivers positioned at ground level.

8. The method of claim 6, which further comprises combining a local oscillator, and an associated mixer, for satellite uplinking, and configuring the local oscillator to operate at standard radio frequencies of the satellite.

9. The method of claim 6, which further comprises uplinking data to the satellite, and downlinking data from the satellite, to cache and/or stream media and internet protocol data within the local ground-level devices.

10. The method of claim 9, wherein the local ground-level devices consist of low-power wireless area network transceivers.

11. The method of claim 6, which further comprises operating and configuring the satellite to transmit the data to a plurality of long-term evolution (LTE) devices positioned at ground level.

* * * * *